US012499850B1

(12) United States Patent
Lin et al.

(10) Patent No.: US 12,499,850 B1
(45) Date of Patent: Dec. 16, 2025

(54) DISPLAY DEVICE AND DRIVING METHOD THEREOF

(71) Applicant: Guangzhou China Star Optoelectronics Semiconductor Display Technology Co., LTd., Guangdong (CN)

(72) Inventors: Shichao Lin, Guangdong (CN); Nian Zhao, Guangdong (CN); Yuguang Chen, Guangdong (CN)

(73) Assignee: Guangzhou China Star Optoelectronics Semiconductor Display Technology Co., Ltd., Guangzhou (CN)

( * ) Notice: Subject to any disclaimer, the term of this patent is extended or adjusted under 35 U.S.C. 154(b) by 0 days.

(21) Appl. No.: 18/789,572

(22) Filed: Jul. 30, 2024

(30) Foreign Application Priority Data

Jul. 16, 2024 (CN) ......................... 202410955319.3

(51) Int. Cl.
*G09G 3/36* (2006.01)

(52) U.S. Cl.
CPC ......... *G09G 3/3688* (2013.01); *G09G 3/3696* (2013.01); *G09G 2310/08* (2013.01); *G09G 2320/0247* (2013.01)

(58) Field of Classification Search
CPC .............. G06F 30/3323; G06F 30/367; G09G 2300/0819; G09G 2300/0842
See application file for complete search history.

(56) References Cited

U.S. PATENT DOCUMENTS

2003/0117344 A1* 6/2003 Hine ........................ G06F 3/147 345/56
2005/0285822 A1* 12/2005 Reddy .................... H10K 65/00 345/76
(Continued)

FOREIGN PATENT DOCUMENTS

CN 104376819 A 2/2015
CN 108182920 A 6/2018
(Continued)

OTHER PUBLICATIONS

Extended European search report issued in corresponding European Patent Application No. 24191206.2 dated Jan. 14, 2025.
(Continued)

*Primary Examiner* — Van N Chow
(74) *Attorney, Agent, or Firm* — PV IP PC; Wei Te Chung

(57) ABSTRACT

A display device and a driving method thereof are provided. A source driver in the display device is configured to transmit data signals to a plurality of sub-pixels, the data signals including a second data signal (for controlling the brightness of a display panel at the sub-pixels) located after a first time point, a voltage generator in the display device includes a common voltage pin for outputting the common voltage signal, and a switch controller connected between the common voltage pin and the common electrode is configured to turn on a circuit between the common voltage pin and the common electrode after the first time point, thereby improving an instantaneous flickering phenomenon at the time of powering on the display device.

16 Claims, 8 Drawing Sheets

(56) References Cited

U.S. PATENT DOCUMENTS

| | | | | |
|---|---|---|---|---|
| 2006/0061795 | A1 * | 3/2006 | Walmsley | G06F 21/73 358/1.14 |
| 2008/0062027 | A1 | 3/2008 | Chung | |
| 2020/0372874 | A1 | 11/2020 | Hu | |
| 2021/0118400 | A1 | 4/2021 | He | |
| 2022/0317058 | A1 * | 10/2022 | Yamamoto | G02B 21/0036 |
| 2024/0106352 | A1 * | 3/2024 | Gose | H05K 7/20927 |

FOREIGN PATENT DOCUMENTS

| | | | |
|---|---|---|---|
| CN | 109559702 | A | 4/2019 |
| CN | 113539204 | A | 10/2021 |
| CN | 114708840 | A | 7/2022 |
| CN | 116704937 | A | 9/2023 |
| EP | 3748959 | A1 | 12/2020 |
| JP | 2010217582 | A | 9/2010 |

OTHER PUBLICATIONS

Chinese Office Action issued in corresponding Chinese Patent Application No. 202410955319.3 dated Oct. 20, 2025, pp. 1-9.

* cited by examiner

DISPLAY DEVICE AND DRIVING METHOD THEREOF

CROSS-REFERENCE TO RELATED APPLICATION

This application claims priority to and the benefit of Chinese Patent Application No. 202410955319.3, filed on Jul. 16, 2024, the entire content of which is hereby incorporated by reference.

TECHNICAL FIELD

The present disclosure relates to the field of display technologies, and more particularly to a display device and a driving method thereof.

BACKGROUND

In a process of powering on an Liquid Crystal Display (LCD), a source driving chip needs to transmit an effective data voltage to a data line in a display area only after receiving a data latch signal. However, due to capacitive coupling between a data line transmitting an invalid voltage and a signal line transmitting another signal before the operation described above, a voltage on the data line may be changed, resulting in an abnormal voltage difference across a liquid crystal molecule, and causing an instantaneous flickering phenomenon of a display screen.

Therefore, there is an instantaneous flickering phenomenon in the conventional LCD in the process of powering on the LCD, and there is an urgent need for improving the flickering phenomenon.

SUMMARY

It is an object of the present disclosure to provide a display device and a driving method thereof, so as to improve the flickering phenomenon of the display device in the process of powering on the display device.

Embodiments of the present disclosure provide a display device, including: a display panel, including a first substrate, a second substrate disposed opposite to the first substrate, and a liquid crystal layer disposed between the first substrate and the second substrate, where the first substrate includes a plurality of sub-pixels arranged in an array, and the second substrate includes a common electrode; a source driver electrically connected to the first substrate and configured to transmit data signals to the plurality of sub-pixels, where the data signals include a first data signal located before a first time point and a second data signal located after the first time point, and the second data signal is configured to control brightness of the display panel at the sub-pixels; a voltage generator including a common voltage pin for outputting a common voltage signal; and a switch controller connected between the common voltage pin and the common electrode and configured to turn on a circuit between the common voltage pin and the common electrode after the first time point.

In some embodiments of the present disclosure, the display device further includes: a timing controller electrically connected to the source driver, where the timing controller is configured to control the source driver to output the second data signal after the first time point, and configured to control the switch controller to turn on a circuit between the common voltage pin and the common electrode after the first time point; where the timing controller is configured to output a switch control signal including a first switch control signal located after the first time point, and the switch controller is configured to control the circuit between the common voltage pin and the common electrode to be turned on according to the first switch control signal.

In some embodiments of the present disclosure, the timing controller is configured to output a data output enable signal including a first data output enable signal located after the first time point, and the source driver is configured to output the second data signal according to the first data output enable signal; where the timing controller is configured to generate the switch control signal based on the data output enable signal.

In some embodiments of the present disclosure, the voltage generator is configured to transmit a source operation voltage to the source driver, and the timing controller is electrically connected to the source driver; where the timing controller is configured to generate the switch control signal based on the source operation voltage.

In some embodiments of the present disclosure, the switch controller includes: a switch input terminal electrically connected to the common voltage pin; a switch output terminal electrically connected to the common electrode; and a switch control terminal electrically connected to the timing controller and configured to turn on a circuit between the switch input terminal and the switch output terminal after the first time point.

In some embodiments of the present disclosure, the switch control terminal is configured to load the switch control signal for controlling the circuit between the switch input terminal and the switch output terminal to be turned on or off.

In some embodiments of the present disclosure, the switch controller includes: a first switch transistor, where a gate of the first switch transistor is configured as the switch control terminal, and a source of the first switch transistor is grounded; and a second switch transistor, where a gate of the second switch transistor is electrically connected to a drain of the first switch transistor, a source of the second switch transistor is configured as the switch input terminal, and a drain of the second switch transistor is configured as the switch output terminal.

Embodiments of the present disclosure further provide a driving method of a display device, where the display device includes a display panel, a source driver, a switch controller, and a voltage generator, the display panel includes a first substrate, a second substrate disposed opposite to the first substrate, and a liquid crystal layer disposed between the first substrate and the second substrate, the first substrate includes a plurality of sub-pixels arranged in an array, the second substrate includes a common electrode, the voltage generator includes a common voltage pin, and the driving method of the display device includes: controlling the source driver to transmit data signals to the plurality of sub-pixels, where the data signals include a first data signal located before a first time point and a second data signal located after the first time point; and controlling the switch controller to turn on a circuit between the common voltage pin and the common electrode after the first time point to enable the common voltage pin to transmit a common voltage signal to the common electrode.

In some embodiments of the present disclosure, the display device further includes: a timing controller electrically connected to the source driver, where the controlling of the switch controller to turn on the circuit between the common voltage pin and the common electrode after the first time point includes: controlling the timing controller to output a data output enable signal and a switch control signal, where the data output enable signal includes a first data output enable signal located after the first time point, and the switch control signal includes a first switch control signal located after the first time point; and controlling the switch controller to control the circuit between the common voltage pin and the common electrode to be turned on according to the first switch control signal; and where the controlling of the source driver to transmit the data signals to the plurality of sub-pixels includes: controlling the source driver to output the second data signal according to the first data output enable signal.

Embodiments of the present disclosure further provide a display device, including: a display panel, including a first substrate, a second substrate disposed opposite to the first substrate, and a liquid crystal layer disposed between the first substrate and the second substrate, where the first substrate includes a plurality of sub-pixels arranged in an array, and the second substrate includes a common electrode; a source driver electrically connected to the first substrate and configured to transmit data signals to the plurality of sub-pixels, where the data signals include a first data signal located before a first time point and a second data signal located after the first time point, and the second data signal is configured to control brightness of the display panel at the sub-pixels; and a voltage generator electrically connected to the display panel and configured to transmit a common voltage signal to the common electrode after the first time point.

The present disclosure provides the display device and the driving method thereof, where the display panel of the display device includes the first substrate, the second substrate disposed opposite to the first substrate, and the liquid crystal layer disposed between the first substrate and the second substrate. By disposing the switch controller connected between the common voltage pin (for outputting the common voltage signal) and the common electrode (included in the second substrate) and configured to turn on the circuit between the common voltage pin and the common electrode after the first time point, the instantaneous flickering phenomenon due to a larger voltage difference between the common electrode and the sub-pixels may be avoided by avoiding the potential of the in-plane data line to be increased due to coupling of the parasitic capacitance when the common electrode is loaded with the potential of the common electrode before the first time point and to be decreased by transmitting a charge by the driving transistor of each of the sub-pixels (included in the first substrate).

DETAILED DESCRIPTION

Technical solutions in embodiments of the present disclosure will be described below in conjunction with drawings in the embodiments of the present disclosure.

In the description of the present disclosure, the term "first", "second", or the like are for illustrative purposes only and are not to be construed as indicating or imposing a relative importance or implicitly indicating the number of technical features indicated. Thus, a feature that limited by "first", "second" may expressly or implicitly include at least one of the features.

Referring to "embodiments" in this specification means that specific features, structures, or characteristics described in connection with the embodiments may be included in at least one embodiment of the present disclosure. The embodiments described in the present disclosure may be combined with other embodiments.

The present disclosure provides a display device, including but not limited to following embodiments and a combination of the following embodiments.

Figure 3:
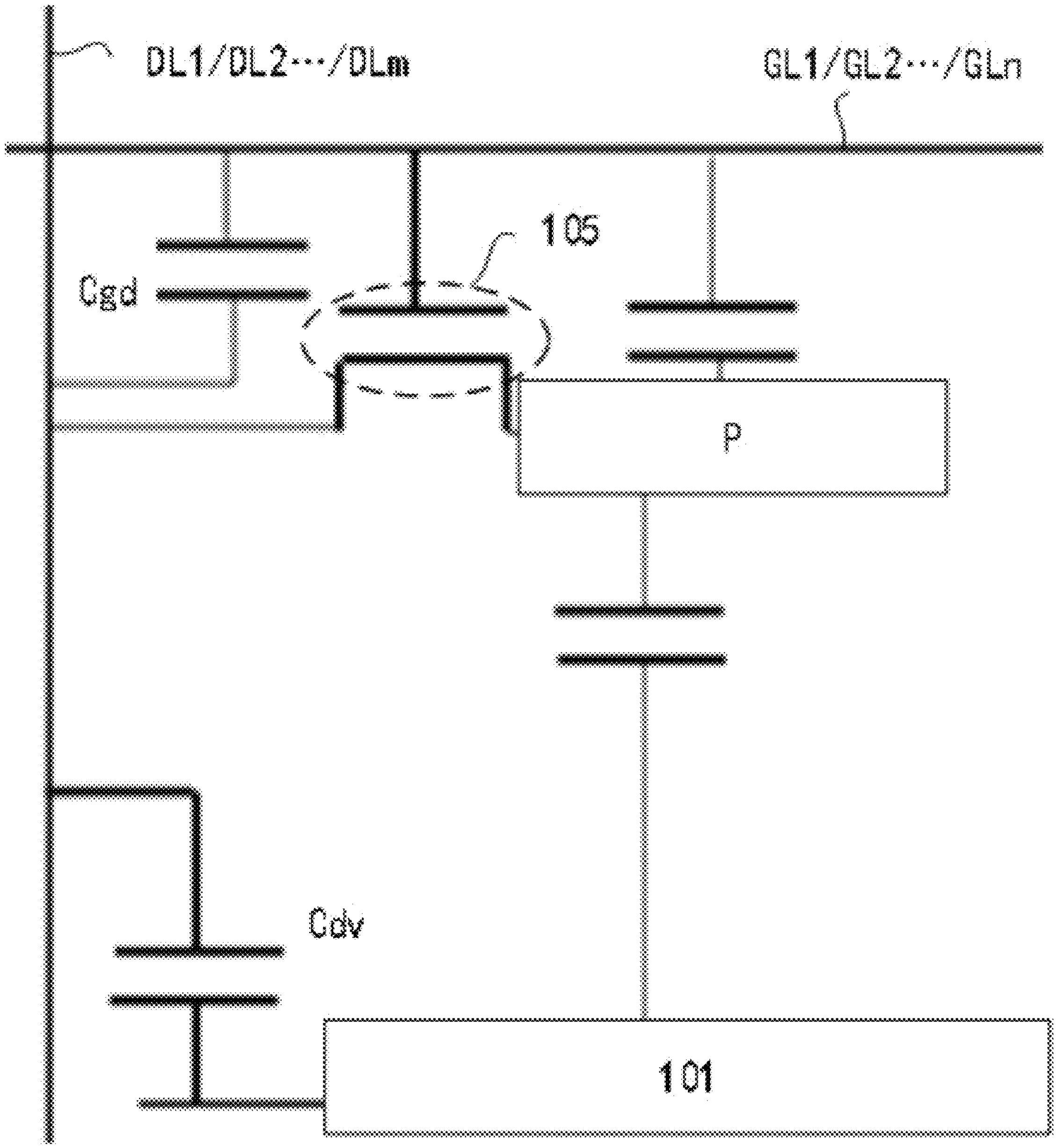
FIG. 3 is an equivalent circuit of a sub-pixel according to some embodiments of the present disclosure.
Figure 4:
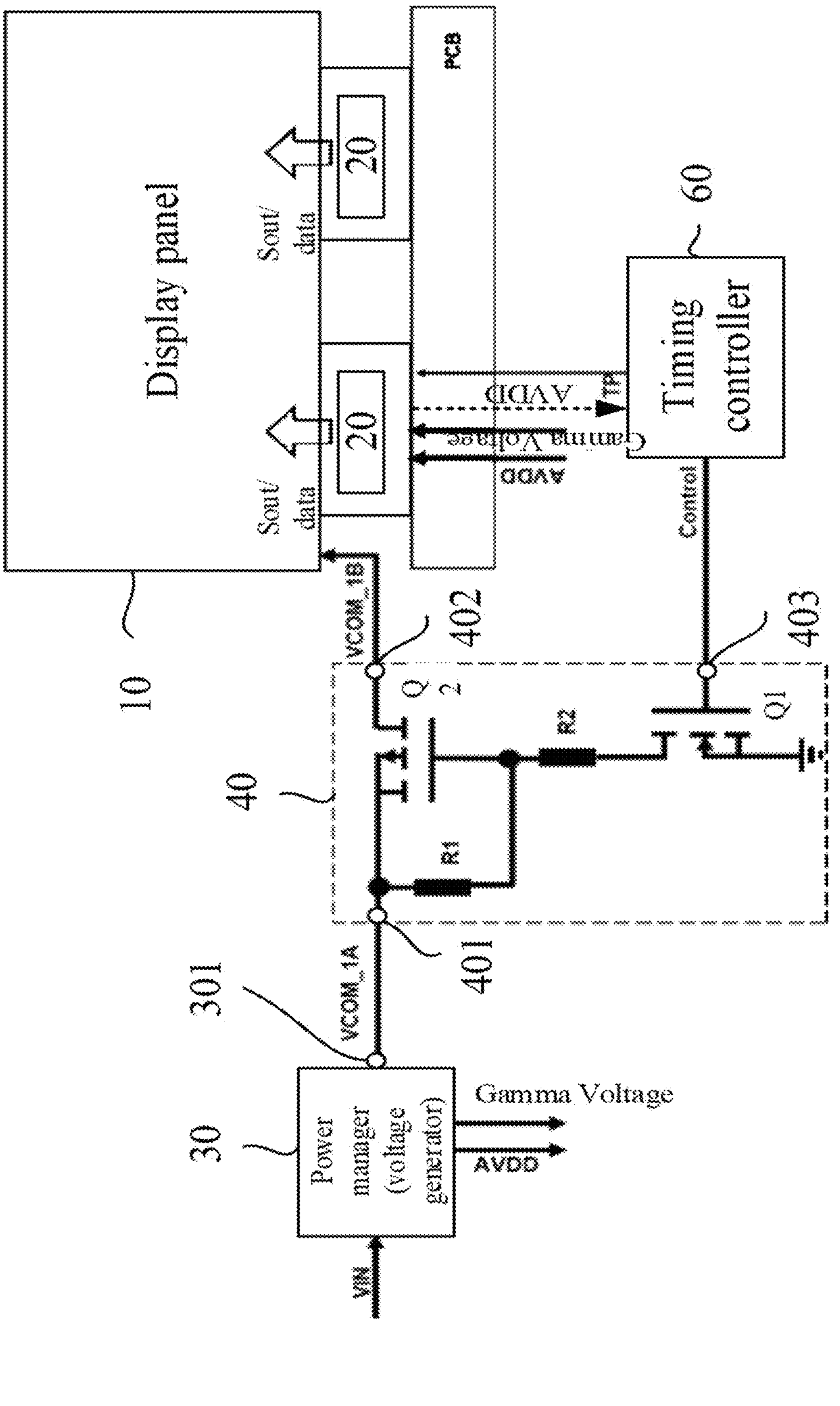
FIG. 4 is an architectural diagram of a display device according to some embodiments of the present disclosure.
Figure 5:
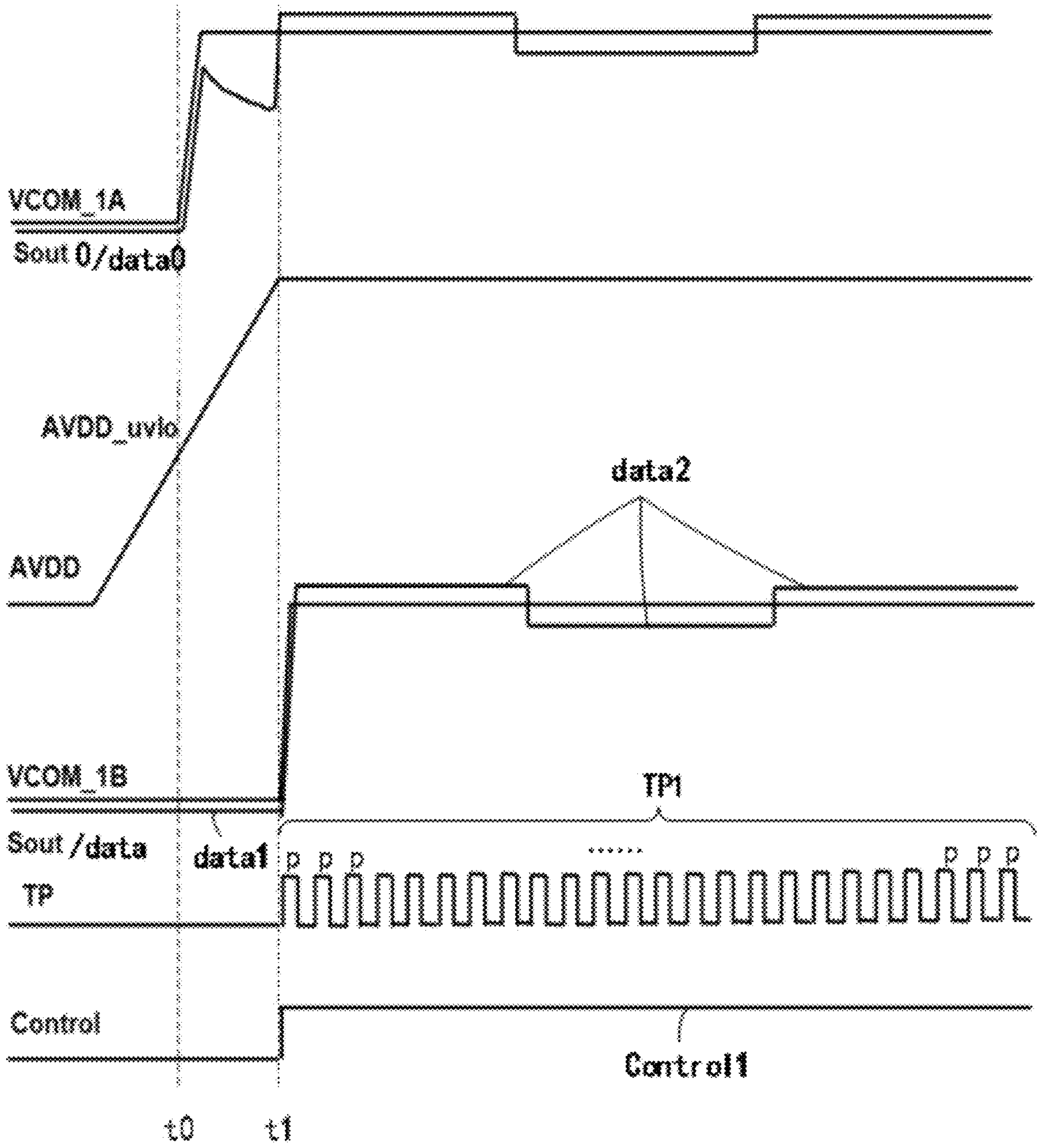
FIG. 5 is a waveform diagram of some signals of a display device according to some embodiments of the present disclosure.

In some embodiments of the present disclosure, as shown in FIGS. 1 to 5, a display device 100 may include: a display panel 10, including a first substrate 103, a second substrate 104 disposed opposite to the first substrate 103, and a liquid crystal layer 102 disposed between the first substrate 103 and the second substrate 104, where the first substrate 103 includes a plurality of sub-pixels P arranged in an array, and the second substrate 104 includes a common electrode 101; a source driver 20 electrically connected to the first substrate 103 and configured to transmit data signals data to the plurality of sub-pixels P, where the data signals data includes a first data signal data1 located before a first time point t1 and a second data signal data2 located after the first time point t1 for controlling brightness of the display panel 10 at the sub-pixels P (where a light source may be provided by a backlight plate), as shown in FIG. 5; a voltage generator (which may be, but not limited to, a power manager 30) including a common voltage pin 301 for outputting a common voltage signal VCOM_1A; and a switch controller 40 connected between the common voltage pin 301 and the common electrode 101 and configured to turn on a circuit between the common voltage pin 301 and the common electrode 101 after the first time point t1.

Figure 1:
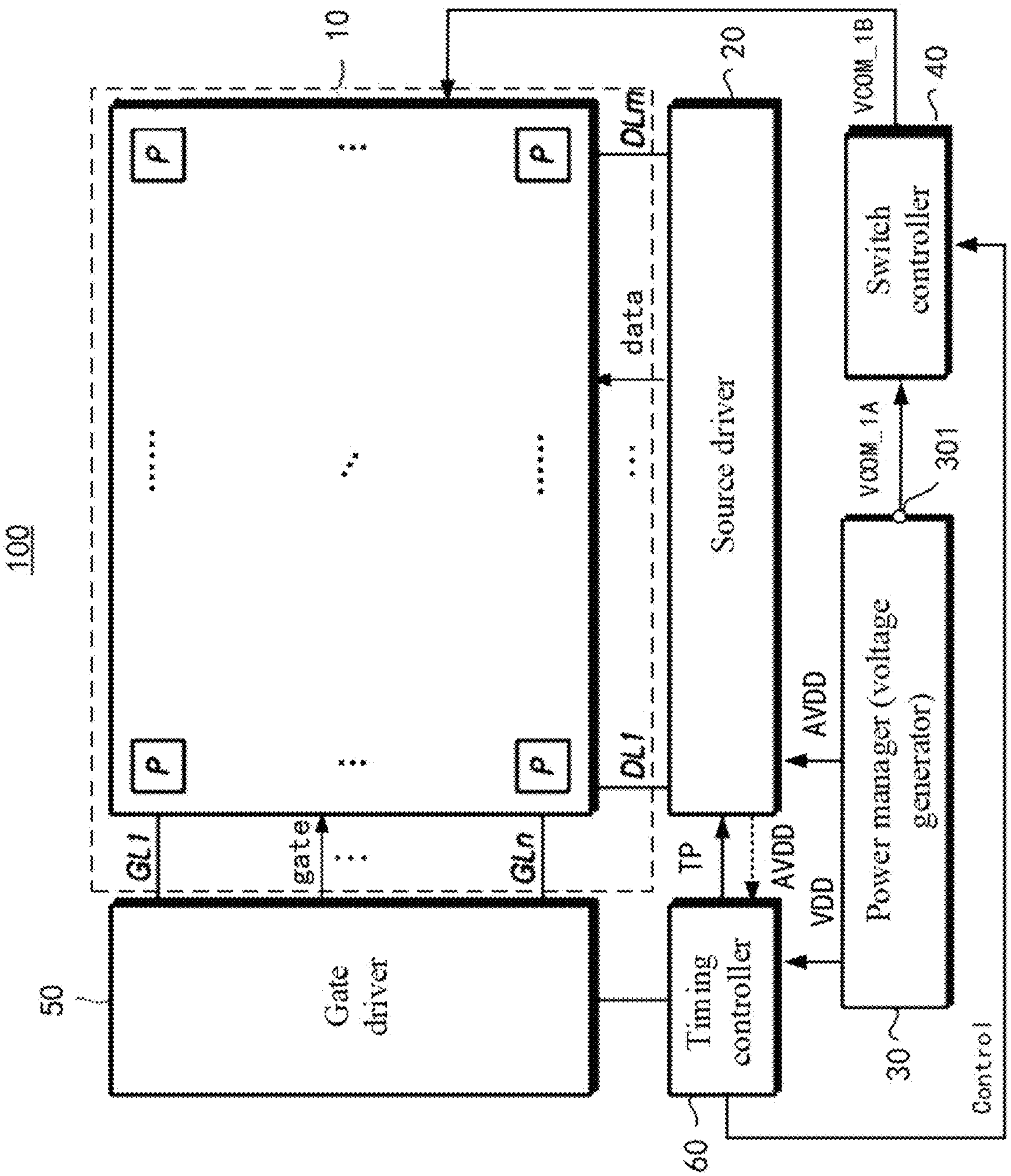
FIG. 1 is an architectural diagram of a display device according to some embodiments of the present disclosure.

As shown in FIG. 1, the display device 100 may further include a gate driver 50, which may be a gate driving circuit located on a substrate of the display panel 10 or a chip provided independently of the display panel 10 (only the latter is shown as an example in FIG. 1). For ease of description, an example in which only the plurality of sub-pixel P are arranged in an array is illustrated in FIG. 1. For example, the array may be arranged in n rows and m columns, where both n and m are positive integers. The display panel 10 may further include a plurality of gate lines (GL1 to GLn) electrically connected to the gate driver 50, and a plurality of data lines (DL1 to DLm) electrically connected to the source driver 20. The gate driver 50 may generate a plurality of gate signals gate corresponding to the plurality of rows of sub-pixels P, where each of the gate lines (one of GL1 to GLn) is electrically connected to corresponding row of the plurality of rows of sub-pixels P to transmit corresponding one of the plurality of gate signals gate corresponding to the each gate line to the corresponding row of sub-pixels P, each of the plurality of gate signals gate includes one or more gate active pulses for controlling the corresponding row of sub-pixels P to be turned on, the plurality of gate active pulses are sequentially arranged on a time axis such that the plurality of rows of sub-pixels P are turned on in sequence. Each of the plurality of data lines (one of DL1 to DLm) is electrically connected to corresponding column of sub-pixels P to transmit corresponding one of the data signals data generated by the source driver 20 to the corresponding column of sub-pixels P, each of data signals data includes a plurality of data voltages corresponding to the corresponding column of a plurality of sub-pixels P (each included in the same second data signal data2), and the plurality of data signals data corresponding to the plurality of column of sub-pixels P are matched so that, when each row of sub-pixels P is turned on, the plurality of data voltages corresponding to the row of the plurality of sub-pixels P can be transmitted to the corresponding plurality of sub-pixels P through the plurality of data lines (DL1 to DLm), respectively.

Figure 2:
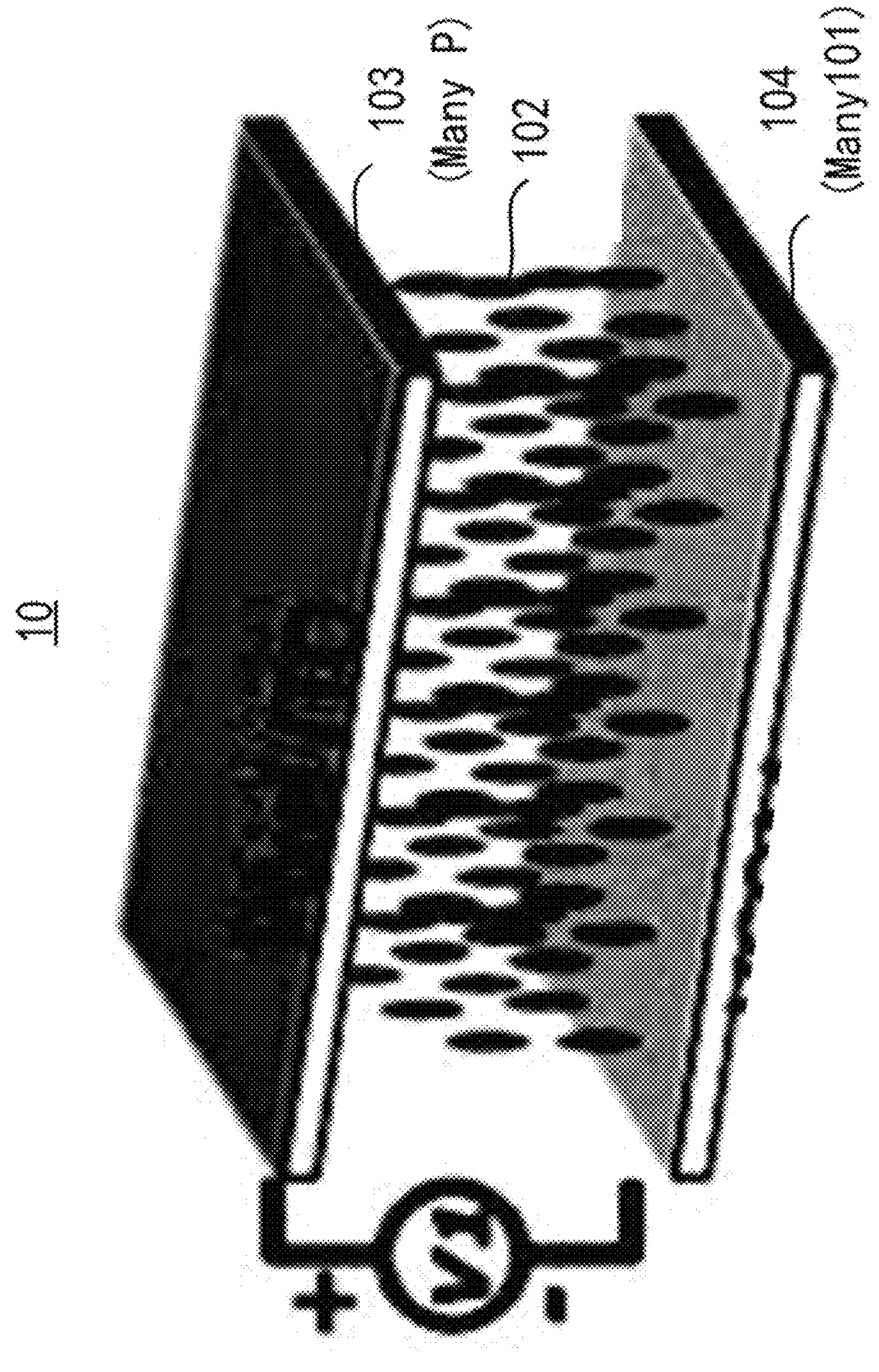
FIG. 2 is a perspective view of a display panel according to some embodiments of the present disclosure.

The display device 100 may be a liquid crystal display device. As shown in FIG. 2, the common electrode 101 may be an entire layer of a film layer disposed opposite to the plurality of sub-pixels P, the liquid crystal layer 102 is disposed between the plurality of sub-pixels P and the common electrode 101, and each of liquid crystal molecules in the liquid crystal layer 102 in a region corresponding to each of the sub-pixels P is correspondingly deflected according to a pressure difference V1 between the sub-pixel P and the common electrode 101 (only the potential of the sub-pixel P is shown to be higher than the potential of the common electrode 101 in FIG. 2, which is not actually limited thereto), so as to achieve a corresponding degree of transmittance for backlight, so that the region in the display panel 10 exhibits a corresponding brightness.

As shown in FIG. 3, an equivalent circuit is formed in which one sub-pixel P and corresponding gate line (one of GL1 to GLn), corresponding data line (one of DL1 to DLm), and the common electrode 101. As shown in FIG. 5, a source operation voltage AVDD may be a signal generated by the power manager 30 for acting on the source driver 20, a common voltage signal VCOM_1A may be a signal of the common voltage pin 301 in the present disclosure, a target common voltage signal VCOM_1B may be a signal of the common electrode 101 in the present disclosure, a contrast source signal Sout0 may be a signal of the source driver 20 electrically connected to the pin of the corresponding data line in the comparative example when the common electrode 101 is directly operated by the common voltage signal VCOM_1A, a source signal Sout may be a signal of the source driver 20 electrically connected to the pin of the corresponding data line when the common electrode 101 is operated by the target common voltage signal VCOM_1B, the contrast source signal Sout0 or the source signal Sout may be approximately identical to a contrast data signal data0 or the data signal data, and a data output enable signal TP may be a signal generated by a timing controller 60 of the display device 100 for acting on the source driver 20.

The power manager 30, the switch controller 40, and the timing controller 60 may be electrically connected to the display panel 10 through a Printed Circuit Board (PCB).

It should be noted in the drawings of the present disclosure that an example in which only the voltage generator is the power manager 30 is illustrated, but the voltage generator may also be a gamma voltage generator (not illustrated) in practice, where the gamma voltage generator may also provide a plurality of gamma voltages to the source driver 20. Of course, the power manager 30 may also provide a timing operation voltage VDD to the timing controller 60 and the source operation voltage AVDD to the source driver 20, where the timing operation voltage VDD is configured to generate at least a data output enable signal TP, and the function of the source operation voltage AVDD may be described later.

After the display device 100 is powered on, the source operation voltage AVDD is gradually increased. At a time point to when the source operation voltage AVDD is increased to a lower limit value AVDD_uvlo of the source operation voltage, the common voltage signal VCOM_1A starts to be increased gradually to reach its stable value. At a time point t1 when the source operation voltage AVDD reaches its stable value, the data output enable signal TP is one or more data latch pulses p. Before the common voltage signal VCOM_1A reaches its stable value (i.e., before the time point t1), the source driver 20 has not yet output an effective potential of the source signal Sout or the contrast source signal Sout0 (which is the potential of the first data signal data1 at this time point), that is, the in-plane data line is still in a suspended state (which can be considered as a potential close to ground). Only after the data output enable signal TP is the data latch pulses p (i.e., after the time point t1), the source signal Sout or the source signal Sout0 is the effective potential (i.e., the potential of the second data signal data2 can be set to be greater than and/or less than the stable value of the common voltage signal VCOM_1A or the target common voltage signal VCOM_1B). The potential of the second data signal data2 being greater than or less than the stable value of the common voltage signal VCOM_1A or the target common voltage signal VCOM_1B may represent, and the stability value of the target common voltage signal VCOM_1B of the second data signal data2 may represent the potential of the second data signal data2 being a positive-polarity data voltage and a negative-polarity data voltage, respectively, which may control the deflection of each of the liquid crystal molecules in opposite directions, and the positive-polarity data voltage and the negative-polarity data voltage (collectively referred to as effective potentials) are used to control the display panel 10 to display a picture normally.

In the comparative example, since the common voltage pin 301 is electrically connected to the common electrode 101, the potential of the common electrode 101 (having the same amplitude as the common voltage signal VCOM_1A) starts to be increased gradually from the time point t0. As shown in FIG. 3 and FIG. 5, the presence of the first parasitic capacitance Cdv between the common electrode 101 and the data line (one of DL1 to DLm) causes the common electrode 101 to be coupled with the data line, potentials of both the data signal data and the contrast source signal Sout0 at this time are increased, and the presence of the second parasitic capacitance Cgd between the data line (one of DL1 to DLm) and the corresponding gate line (one of GL1 to GLn) causes the potential of the gate line to be increased, so that a driving transistor 105 in the display panel 10 is not turned off sufficiently (micro-on), and the charge on the data line is leaked to the sub-pixel P (a pixel electrode) to reduce the potential of the contrast source signal Sout0. However, since the source driver 20 has not yet output the effective potential of the contrast source signal Sout0 between the time points t0 and t1, the potential of the data lines increased by the coupling of the data line to the common electrode 101 cannot be maintained, so that there is a pressure difference between the data line and the common electrode 101. Therefore, the liquid crystal molecules at the corresponding positions are deflected, and an instantaneous flickering phenomenon may occur before the source driver 20 outputs the effective potential of the contrast source signal Sout0 to display the picture normally after the display panel is powered on.

In the present embodiment of the present disclosure, since the switch controller 40 connected between the common voltage pin 301 and the common electrode 101 is provided for turning on the circuit between the common voltage pin 301 and the common electrode 101 after the first time point t1, although the common voltage signal VCOM_1A may be gradually increased between t0 and t1 before the t1, the in-plane common electrode 101 is suspended, and the target common voltage signal VCOM_1B can be considered as a potential close to ground, so that the potentials of the data line and the source signal Sout of the pin of the source driver electrically connected to the data line may be not increased due to the coupling of the common voltage signal VCOM_1B to the data line (also considered as a potential close to ground), and there is no voltage difference across each of the liquid crystal molecules, thereby improving the instantaneous flickering phenomenon at the time of powering on the display device. The switch controller 40 is turned on after the first time point t1, the potential of the target common voltage signal VCOM_1B (that is, the potential of the common electrode 101) is increased to the potential of the common voltage signal VCOM_1A (that is, the stable value thereof) at this time, and the source driver 20 outputs the effective potential of the source signal Sout1 to display the picture normally.

In some embodiments of the present disclosure, as shown in FIGS. 1 to 5, the display device 100 may further include the timing controller 60 electrically connected to the source driver 20, where the timing controller 60 is configured to control the source driver 20 to output the second data signal data2 after the first time point t1 and control the switch controller 40 to turn on a circuit between the common voltage pin 301 and the common electrode 101 (included in the display panel 10) after the first time point t1. The timing controller 60 is configured to output a switch control signal Control including a first switch control signal Control1 located after the first time point t1, and the switch controller 40 is configured to control the circuit between the common voltage pin 301 and the common electrode 101 to be turned on according to the first switch control signal Control1.

It should be understood that the timing controller 60 may control the source driver 20 to output the second data signal data2 after the first time point t1 by being electrically connected to the source driver 20, and at the same time may directly or indirectly control the switch controller 40 to turn on the circuit between the common voltage pin 301 and the common electrode 101 (included in the display panel 10), so that the common electrode 101 loads the common voltage signal VCOM_1A which is close to its own stable value at this time, and the potential of the common electrode 101 may reach the stable value of the common voltage signal VCOM_1A relatively quickly. In this case, the brightness of the display panel 10 at each of the sub-pixels P may be determined according to the second data signal data2.

In some embodiments of the present disclosure, as shown in FIGS. 1 to 5, the timing controller 60 is configured to output the above-described data output enable signal TP including a first data output enable signal TP1 after the first time point t1, and the source driver 20 is configured to output the second data signal data2 according to the first data output enable signal TP1, where the timing controller 60 is configured to generate the switch control signal Control according to the data output enable signal TP.

The source driver 20 is configured to output the data signals data according to the data output enable signal TP. As shown in FIG. 5, the first data output enable signal TP1 located after the first time point t1 in the data output enable signal TP may include a plurality of data latch pulses p, and the second data signal data2 located after the first time point t1 in the data signal data may include a plurality of data voltages (a first portion of data voltages and a second portion of data voltages may be greater than or less than stable values of the common voltage signal VCOM_1A or the target common voltage signal VCOM_1B, respectively, and the first portion of data voltages and the second portion of data voltages may be alternately set). As discussed above, the first portion of data voltages and the second portion of data voltages described herein may be respectively referred to as positive-polarity data voltages and negative-polarity data voltages, which may control the deflection of each of the liquid crystal molecules in opposite directions, and the positive-polarity data voltages and the negative-polarity data voltages (collectively referred to as effective potentials) are used to control the display panel 10 to display a picture normally.

Each of the data latch pulses p may be used to control pins of a plurality of buffers of the source driver 20 to transmit respective plurality of data voltages (corresponding to the plurality of sub-pixels P of the same row) to the plurality of data lines, respectively, so that the plurality of rows of sub-pixels P are sequentially loaded with the corresponding data voltages under the action of the plurality of data latch pulses p. For example, in FIG. 5, the pin of each of the buffers may successively output a plurality of data voltages corresponding to the plurality of rows of sub-pixels P in the first portion of data voltages firstly according to successive arrangement of the plurality of data latch pulses p, then the pin of each of the buffers may successively output a plurality of data voltages corresponding to the plurality of rows of sub-pixels P in the second portion of data voltages according to successive arrangement of the plurality of data latch pulses p, and the first portion of data voltages and the second portion of data voltages may correspond to one frame, less than one frame, or more than one frame of data, so that a polarity inversion function of the display device 100 can be realized.

It should be understood that, since the first data output enable signal TP1 and the first switch control signal Control1 start from the first time point t1, a start point of the second data signal data2 output by the source driver 20 according to the first data output enable signal TP1 is the same as a start point of turning on the circuit between the common voltage pin 301 and the common electrode 101 controlled according to the first switch control signal Control1, so that it is possible to avoid the picture flickering phenomenon due to the potential (its stable value) of VCOM_1A loaded by the common electrode 101 before the second data signal data2 is generated when the display device is powered on.

In some embodiments of the present disclosure, as shown in FIGS. 1 to 5, the voltage generator (taking the power manager 30 as an example) is used to transmit the source operation voltage AVDD to the source driver 20, the timing controller 60 is electrically connected to the source driver 20 (seeing dashed line portion) to load the source operation voltage AVDD, and the timing controller 60 is used to generate the switch control signal Control according to the source operation voltage AVDD.

Specifically, the source operation voltage AVDD is transmitted to the source driver 20 as the operation voltage of each of the above-mentioned buffers inside the source driver 20, and the buffer can output corresponding data signal data to corresponding data line (one of DL1 to DLm) according to a signal (related to the data signal data) of an input terminal of the buffer in the operation state of the buffer, while the magnitude of the source operation voltage AVDD can affect the magnitude of the current at the output terminal of the buffer. As shown in FIG. 5, when the display device 100 is powered on, the source operation voltage AVDD provided by the voltage generator (for example, the power manager 30) needs to be increased gradually to its stable value, so that the current at the output terminal of the buffer is large enough to input the data signal data (referred to as the source signal Sout at this time) into the display panel 10. As can be seen from the above discussion, the source operation voltage AVDD reaches its stable value at the first time point t1.

In some embodiments of the present disclosure, as shown in FIGS. 1 to 4, the switch controller 40 may include: a switch input terminal 401 electrically connected to the common voltage pin 301; a switch output terminal 402 electrically connected to the common electrode 101; a switch control terminal 403 electrically connected to the timing controller 60 and configured to turn on the circuit between the switch input terminal 401 and the switch output terminal 402 after the first time point t1.

As can be seen from the above discussion, the data output enable signal TP generated by the timing controller 60 can be used to determine the data signal data generated by the source driver 20, and the start time of the first data output enable signal TP1 of the data output enable signal TP and the start time of the second data signal data2 of the source driver are both the first time point. Therefore, by electrically connecting the switch control terminal 403 to at least one of the timing controller 60 and the source driver 20 in the present embodiment of the present disclosure, at least one of the data output enable signal TP and the data signal data can be received, so as to turn on the circuit between the switch input terminal 401 and the switch output terminal 402 at the first time point according to the potential of the at least one signal to turn on the circuit between the common voltage pin 301 and the common electrode 101.

For example, as shown in FIGS. 1 and 4, the switch control signal Control may be generated according to the data output enable signal TP generated by the timing controller 60. As shown in FIG. 5, the timing controller 60 may determine whether the first data output enable signal TP1 is present in the data output enable signal TP in real time, and synchronously output the first switch control signal Control1 at the time point when the first data output enable signal TP1 is present (that is, the time point when the first data latch pulse p is present), so as to turn on the circuit between the switch input terminal 401 and the switch output terminal 402, and before the time point, the switch control signal Control in which the first switch control signal Control1 is not present is configured to turn the circuit between the switch input terminal 401 and the switch output terminal 402 off.

For another example, as shown in FIGS. 1 and 4, the switch control signal Control may be generated according to the source operation voltage AVDD transmitted to the source driver 20. As shown in FIG. 5, at this time point, the switch control signal Control may be generated based on the source operation voltage AVDD obtained by the source driver 20, and the timing controller 60 may synchronously output the first switch control signal Control1 at the time point when the source operation voltage AVDD reaches its stable value (that is, the time point when the first data latch pulse p occurs) to realize the above function.

In some embodiments of the present disclosure, as shown in FIG. 4, the switch controller 40 may include: a first switch transistor Q1, where a gate of the first switch transistor Q1 is configured as the switch control terminal 403 and a source of the first switch transistor Q1 is grounded; and a second switch transistor Q2, where a gate of the second switch transistor Q2 is electrically connected to a drain of the first switch transistor Q1, a source of the second switch transistor Q2 is configured as the switch input terminal 401, and a drain of the second switch transistor Q2 is configured as the switch output terminal 402.

For ease of description, an example in which the first switch transistor Q1 is an NMOS transistor and the second switch transistor Q2 is a PMOS transistor is illustrated herein based on the above connection of the circuit. A first resistor R1 may be connected between the gate of the second switch transistor Q2 and the source of the second switch transistor Q2, and a second resistor R2 may be connected between the gate of the second switch transistor Q2 and the drain of the first switch transistor Q1. Resistance values of the first resistor R1 and the second resistor R2 may be set according to the functional requirements and settings of the switch controller 40. With reference to the waveform diagram shown in FIG. 5, the operation of the display device 100 may be as follows.

At the time point t1 when the source operation voltage AVDD reaches its stable value after the display device 100 is powered on, the timing controller 60 outputs the first data output enable signal TP1 to the source driver 20. The source signal Sout output by the source driver 20 is an effective potential. That is, the in-plane sub-pixel P receives the first data signal data1 while the level of the switch control signal Control is increased to form the first switch control signal Control1, which is configured to turn on the first switch transistor Q1 of NMOS transistor. The ground potential is pulled down through the first switch transistor Q1 to the potential of the gate of the second switch transistor Q2 of PMOS transistor to turn on the second switch transistor Q2. Thus, the circuit between the common voltage pin 301 and the common electrode 101 is turned on, and the in-plane common electrode 101 is loaded with the effective potential of the common voltage signal VCOM_1A (that is, the potential of the target common voltage signal VCOM_1B) at this time.

When the first switch transistor Q1 is turned off, the potential of the gate of the second switch transistor Q2 can be pulled up by the first resistor R1, and when the first switch transistor Q1 is turned on, the potential of the gate of the second switch transistor Q2 can be pulled down by the second resistor R2. It should be noted that if the first resistor R1 is not provided so that both the gate and the source of the second switch transistor Q2 are not connected to each other, then when the first switch transistor Q1 is not turned on, the gate of the second switch transistor Q2 is affected by external capacitive coupling or the like, so that the potential of the second switch transistor Q2 is pulled down, thereby causing the second switch transistor Q2 to be turned on by mistake. If both the gate and the source of the second switch transistor Q2 are connected only by a wire rather than the first resistor R1, even if the first switch transistor Q1 is turned on, the gate of the second switch transistor Q2 may not be pulled down to a low level, but may remain at the same potential as the common voltage signal VCOM_1A. The second resistor R2 may act as a current limiting function.

Of course, the power manager 30 may also transmit a gamma voltage Gamma Voltage to the source driver 20, and the source driver 20 may generate a data voltage corresponding to each of the sub-pixels P according to a gray scale value of the each sub-pixel P and the gamma voltage Gamma Voltage. The voltage generator (taking the power manager 30 as an example) may transmit a corresponding voltage signal to the timing controller 60 to control its operation under the action of an external input signal VIN, and transmit the source operation voltage AVDD and the gamma voltage Gamma Voltage to the source driver 20 to control its operation.

In order to better explain the above-described display device, the present disclosure also provides a driving method of the display device, which may include, but not limited to, the following embodiments and a combination of the following embodiments.

Figure 6:
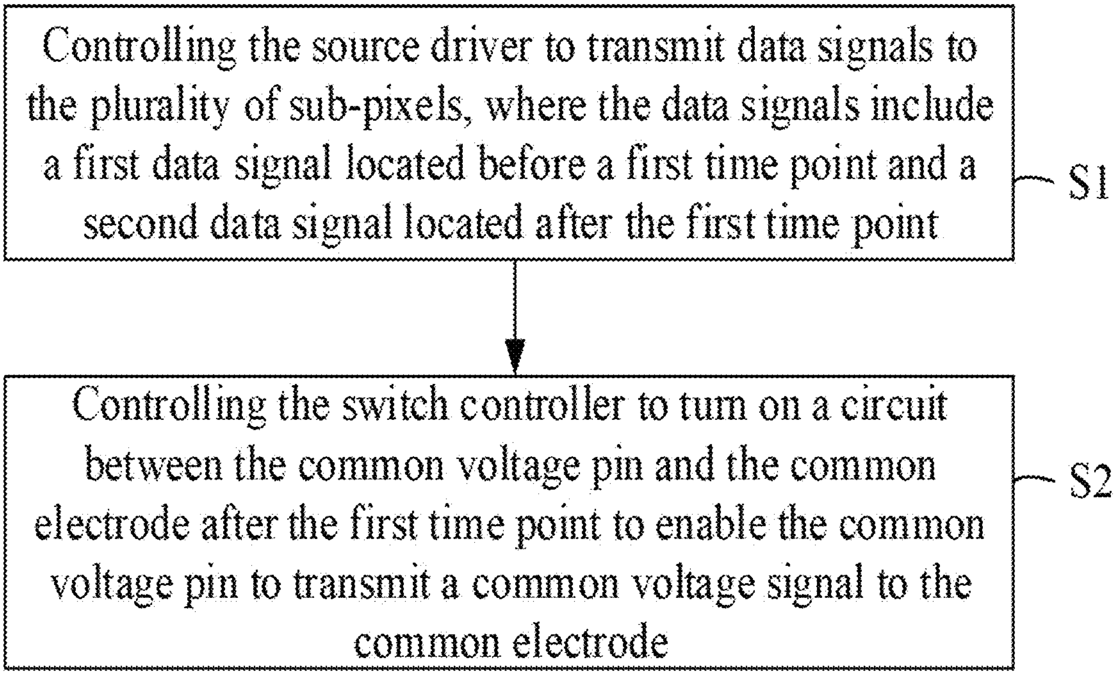
FIGS. 6 and 7 are flowcharts of a driving method of a display device according to some embodiments of the present disclosure.

In some embodiments of the present disclosure, as shown in FIG. 6, the driving method of the display device may include, but not limited to, following steps and a combination of the following steps.

At step S1, the source driver may be controlled to transmit data signals to the plurality of sub-pixels, where the data signals include a first data signal located before a first time point and a second data signal located after the first time point.

Where an execution body of the step S1 may include the above-mentioned source driver 20, and specific details of the step S1 may be described with reference to the above-mentioned related description.

At step S2, the switch controller may be controlled to turn on a circuit between the common voltage pin and the common electrode after the first time point to enable the common voltage pin to transmit a common voltage signal to the common electrode.

As discussed in the comparative example, if the common voltage pin 301 is electrically connected to the common electrode 101, the potential of the common electrode 101 (which is the same as the amplitude of the common voltage signal VCOM_1A) may be gradually increased from the time point t0, the potential of the data line may be increased by coupling the common electrode 101 with the data line and may be decreased by transmitting charge by the driving transistor 105, so that there is a voltage difference between the data line and the common electrode 101, and the instantaneous flickering phenomenon may occur at the time of powering on the display panel.

Where an execution body of the step S2 may include the above-mentioned switch controller 40, and specific details of the step S2 may be described with reference to the above-mentioned related description.

As discussed above, by disposing the switch controller 40 connected between the common voltage pin 301 and the common electrode 101 and configured to turn on the circuit between the common voltage pin 301 and the common electrode 101 after the first time point t1 in the present disclosure, the common electrode 101 is suspended, the potential of the data line may be not increased, and there is no voltage difference across each of the liquid crystal molecules, thereby improving the instantaneous flickering phenomenon at the time of powering on the display panel.

Figure 7:
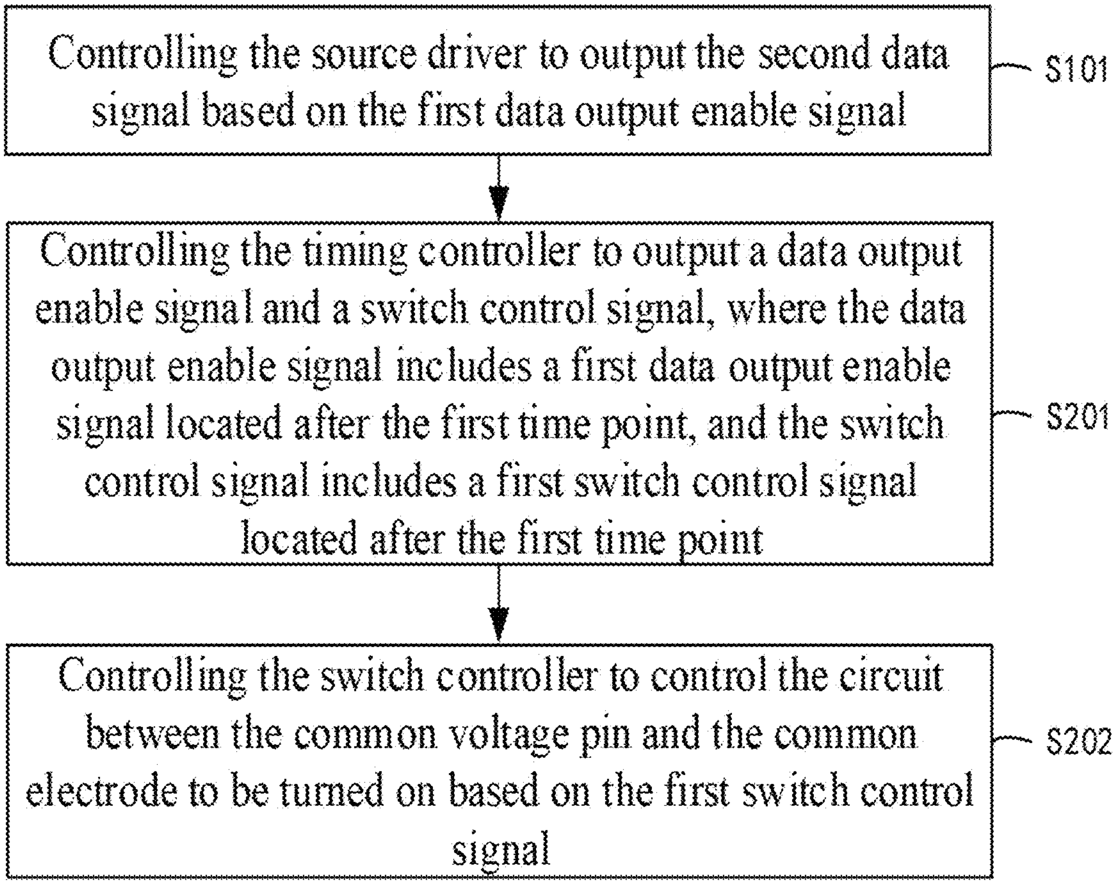

In some embodiments of the present disclosure, as shown in FIG. 7, the step S2 may include, but not limited to, following steps.

At step S201, the timing controller may be controlled to output a data output enable signal and a switch control signal, where the data output enable signal includes a first data output enable signal located after the first time point, and the switch control signal includes a first switch control signal located after the first time point.

Where an execution body of the step S201 may include the above-mentioned timing controller 60, and specific details of the step S201 may be described with reference to the above-mentioned related description. Of course, as discussed above, the switch control signal Control may also be generated by the source driver 20.

At step S202, the switch controller may be controlled to control the circuit between the common voltage pin and the common electrode to be turned on according to the first switch control signal.

Where an execution body of the step S202 may include the above-mentioned switch controller 40, and specific details of the step S202 may be described with reference to the above-mentioned related description.

Based on the above steps S201 and S202, the step S1 may include but not limited to the following steps.

At step S101, the source driver may be controlled to output the second data signal according to the first data output enable signal.

Similarly, an execution body of the step S101 may include the above-mentioned source driver 20, and specific details of the step S101 may be described with reference to the above-mentioned related description.

As discussed above, since the first data output enable signal TP1 and the first switch control signal Control1 start from the first time point t1, a start point of the second data signal data2 output according to the first data output enable signal TP1 is the same as a start point of turning on the circuit between the common voltage pin 301 and the common electrode 101 controlled according to the first switch control signal Control1, so that it is possible to avoid the picture flickering phenomenon due to the potential (its stable value) of VCOM_1A loaded by the common electrode 101 before the second data signal data2 is generated when the display device is powered on.

Figure 8:
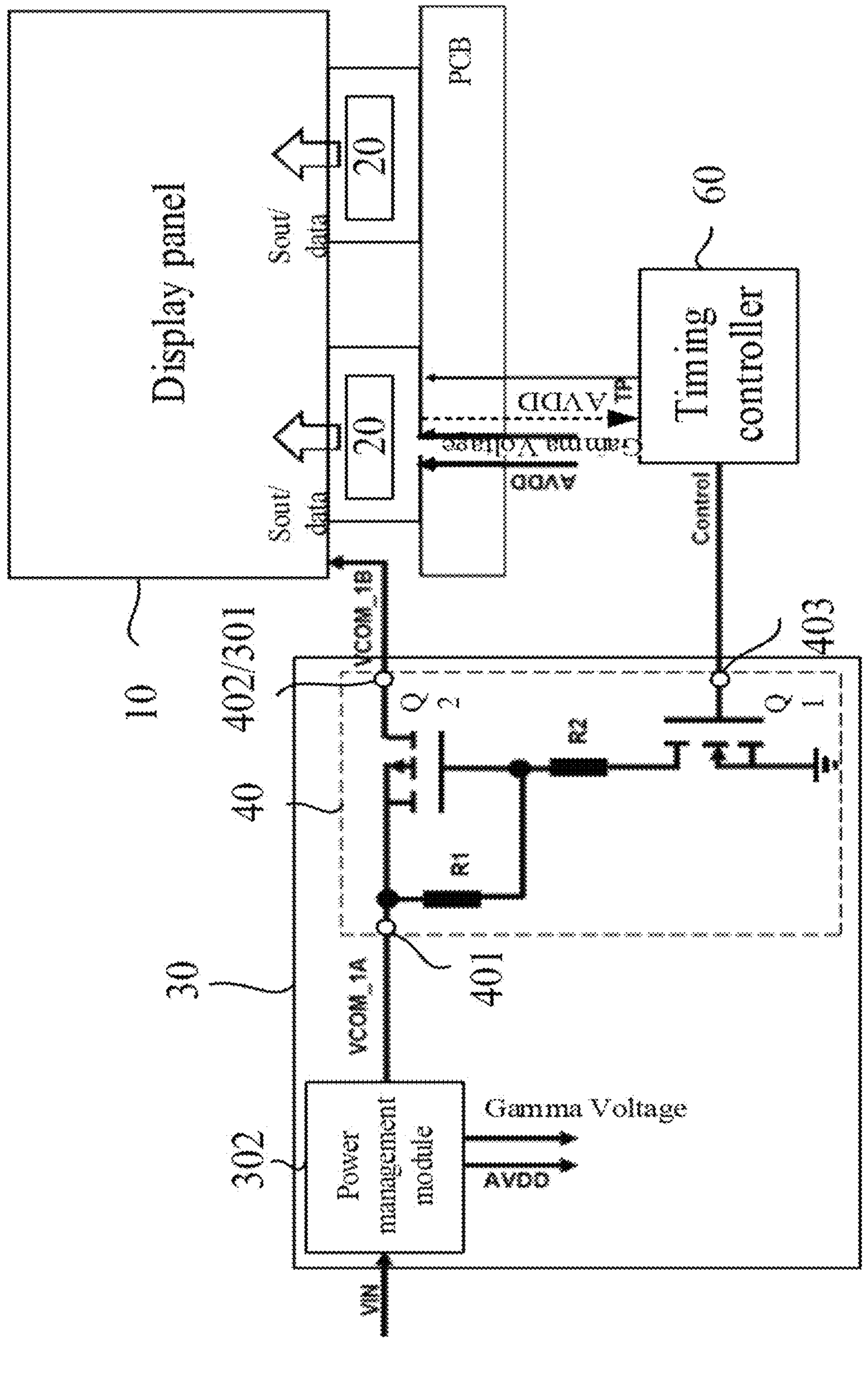
FIG. 8 is an architectural diagram of a display device according to some embodiments of the present disclosure.

The present disclosure further provides another display device. As shown in FIGS. 2, 3, and 8, the display device 100 may include: a display panel 10, including a first substrate 103, a second substrate 104 disposed opposite to the first substrate 103, and a liquid crystal layer 102 disposed between the first substrate 103 and the second substrate 104, where the first substrate 103 includes a plurality of sub-pixels P arranged in an array, and the second substrate 104 includes a common electrode 101; a source driver 20 electrically connected to the first substrate 103 and configured to transmit data signals data to the plurality of sub-pixels P, where the data signals data includes a first data signal data1 located before a first time point t1 and a second data signal data2 located after the first time point t1 for controlling brightness of the display panel 10 at the sub-pixels; and a power manager 30 electrically connected to the display panel 10 and configured to transmit a common voltage signal VCOM_1A to the common electrode after the first time point t1.

Specifically, the display device 100 in the present embodiment is different from the above embodiments in that the switch controller 40 is integrated in the power manager 30 in the present embodiment. Of course, the power manager 30 may further include a power management module 302, which may generate a signal generated by the power manager 30 in the above embodiment. That is, the power management module 302 may generate at least the common voltage signal VCOM_1A. In this case, the switch output terminal 402 of the switch controller 40 integrated in the power manager 30 is a common voltage pin 301 for transmitting the common voltage signal VCOM_1A to the common electrode.

It should be understood in the present embodiment that, since the switch controller 40 is integrated in the power manager 30, the power manager 30 can directly transmit the common voltage signal VCOM_1A to the common electrode after the first time point t1, i.e., the target common voltage signal VCOM_1B described above transmitted from the power manager 30 to the common electrode in FIG. 8.

Technical features in the present embodiment, such as the display panel 10, the sub-pixel P, the common electrode 101, the source driver 20, the data signal data, the first data signal data1, the second data signal data2, and the common voltage signal VCOM_1A, can refer to the related description of the above embodiments.

The present disclosure provides the display device and the driving method thereof, where the display panel of the display device includes the first substrate, the second substrate disposed opposite to the first substrate, and the liquid crystal layer disposed between the first substrate and the second substrate. By disposing the switch controller connected between the common voltage pin (for outputting the common voltage signal) and the common electrode (included in the second substrate) and configured to turn on the circuit between the common voltage pin and the common electrode after the first time point, the instantaneous flickering phenomenon due to a larger voltage difference between the common electrode and the sub-pixels may be avoided by avoiding the potential of the in-plane data line to be increased due to coupling of the parasitic capacitance when the common electrode is loaded with the potential of the common electrode before the first time point and to be decreased by transmitting a charge by the driving transistor of each of the sub-pixels (included in the first substrate).

The display device and the driving method thereof provided in the embodiments of the present disclosure are described in detail above. In this specification, principles and implementations of the present disclosure are illustrated by applying specific examples herein. The description of the above embodiments is only used to help understand the technical solutions and core ideas of the present disclosure; those of ordinary skill in the art should understand that it is still possible to modify the technical solutions recorded in the foregoing embodiments, and these modifications or replacements do not cause the essence of the corresponding technical solutions to deviate from the scope of the technical solutions of the embodiments of the present disclosure.

What is claimed is:

1. A display device, comprising:

a display panel, comprising a first substrate, a second substrate disposed opposite to the first substrate, and a liquid crystal layer disposed between the first substrate and the second substrate, wherein the first substrate comprises a plurality of sub-pixels arranged in an array, and the second substrate comprises a common electrode;

a source driver electrically connected to the first substrate and configured to transmit data signals to the plurality of sub-pixels, wherein the data signals comprise a first data signal located before a first time point and a second data signal located after the first time point, and the second data signal is configured to control brightness of the display panel at the sub-pixels;

a voltage generator comprising a common voltage pin for outputting a common voltage signal;

a switch controller connected between the common voltage pin and the common electrode and configured to turn on a circuit between the common voltage pin and the common electrode after the first time point; and a timing controller electrically connected to the source driver, wherein the timing controller is configured to control the source driver to output the second data signal after the first time point, and configured to control the switch controller to turn on a circuit between the common voltage pin and the common electrode after the first time point;

wherein the timing controller is configured to output a switch control signal comprising a first switch control signal located after the first time point, and the switch controller is configured to control the circuit between the common voltage pin and the common electrode to be turned on based on the first switch control signal;

wherein the timing controller is configured to output a data output enable signal comprising a first data output enable signal located after the first time point, and the source driver is configured to output the second data signal based on the first data output enable signal; and wherein the timing controller is configured to generate the switch control signal based on the data output enable signal.

2. The display device of claim 1, wherein the voltage generator is configured to transmit a source operation voltage to the source driver, and the timing controller is electrically connected to the source driver;

wherein the timing controller is configured to generate the switch control signal based on the source operation voltage.

3. The display device of claim 1, wherein the switch controller comprises:

a switch input terminal electrically connected to the common voltage pin;

a switch output terminal electrically connected to the common electrode; and a switch control terminal electrically connected to the timing controller and configured to turn on a circuit between the switch input terminal and the switch output terminal after the first time point.

4. The display device of claim 1, wherein the switch controller comprises:

a switch input terminal electrically connected to the common voltage pin;

a switch output terminal electrically connected to the common electrode; and a switch control terminal electrically connected to the timing controller and configured to turn on a circuit between the switch input terminal and the switch output terminal after the first time point.

5. The display device of claim 2, wherein the switch controller comprises:

a switch input terminal electrically connected to the common voltage pin;

a switch output terminal electrically connected to the common electrode; and a switch control terminal electrically connected to the timing controller and configured to turn on a circuit between the switch input terminal and the switch output terminal after the first time point.

6. The display device of claim 3, wherein the switch control terminal is configured to load the switch control signal for controlling the circuit between the switch input terminal and the switch output terminal to be turned on or off.

7. The display device of claim 4, wherein the switch control terminal is configured to load the switch control signal for controlling the circuit between the switch input terminal and the switch output terminal to be turned on or off.

8. The display device of claim 5, wherein the switch control terminal is configured to load the switch control signal for controlling the circuit between the switch input terminal and the switch output terminal to be turned on or off.

9. The display device of claim 3, wherein the switch controller comprises:

a first switch transistor, wherein a gate of the first switch transistor is configured as the switch control terminal, and a source of the first switch transistor is grounded; and a second switch transistor, wherein a gate of the second switch transistor is electrically connected to a drain of the first switch transistor, a source of the second switch transistor is configured as the switch input terminal, and a drain of the second switch transistor is configured as the switch output terminal.

10. The display device of claim 4, wherein the switch controller comprises:

a first switch transistor, wherein a gate of the first switch transistor is configured as the switch control terminal, and a source of the first switch transistor is grounded; and a second switch transistor, wherein a gate of the second switch transistor is electrically connected to a drain of the first switch transistor, a source of the second switch transistor is configured as the switch input terminal, and a drain of the second switch transistor is configured as the switch output terminal.

11. The display device of claim 5, wherein the switch controller comprises:

a first switch transistor, wherein a gate of the first switch transistor is configured as the switch control terminal, and a source of the first switch transistor is grounded; and a second switch transistor, wherein a gate of the second switch transistor is electrically connected to a drain of the first switch transistor, a source of the second switch transistor is configured as the switch input terminal, and a drain of the second switch transistor is configured as the switch output terminal.

12. A driving method of a display device, wherein the display device comprises a display panel, a source driver, a switch controller, and a voltage generator, the display panel comprises a first substrate, a second substrate disposed opposite to the first substrate, and a liquid crystal layer disposed between the first substrate and the second substrate, the first substrate comprises a plurality of sub-pixels arranged in an array, the second substrate comprises a common electrode, the voltage generator comprises a common voltage pin, and the driving method of the display device comprises:

controlling the source driver to transmit data signals to the plurality of sub-pixels, wherein the data signals comprise a first data signal located before a first time point and a second data signal located after the first time point; and controlling the switch controller to turn on a circuit between the common voltage pin and the common electrode after the first time point to enable the common voltage pin to transmit a common voltage signal to the common electrode, wherein the display device further comprises: a timing controller electrically connected to the source driver, and wherein the controlling of the switch controller to turn on the circuit between the common voltage pin and the common electrode after the first time point comprises:

controlling the timing controller to output a data output enable signal and a switch control signal, wherein the data output enable signal comprises a first data output enable signal located after the first time point, and the switch control signal comprises a first switch control signal located after the first time point; and controlling the switch controller to control the circuit between the common voltage pin and the common electrode to be turned on based on the first switch control signal; and wherein the controlling of the source driver to transmit the data signals to the plurality of sub-pixels comprises:

controlling the source driver to output the second data signal based on the first data output enable signal.

13. A display device, comprising:

a display panel, comprising a first substrate, a second substrate disposed opposite to the first substrate, and a liquid crystal layer disposed between the first substrate and the second substrate, wherein the first substrate comprises a plurality of sub-pixels arranged in an array, and the second substrate comprises a common electrode;

a source driver electrically connected to the first substrate and configured to transmit data signals to the plurality of sub-pixels, wherein the data signals comprise a first data signal located before a first time point and a second data signal located after the first time point, and the second data signal is configured to control brightness of the display panel at the sub-pixels;

a voltage generator electrically connected to the display panel and configured to transmit a common voltage signal to the common electrode after the first time point; and a timing controller electrically connected to the source driver, wherein the timing controller is configured to output a data output enable signal comprising a first data output enable signal located after the first time point, and the source driver is configured to output the second data signal based on the first data output enable signal; and wherein the timing controller is configured to generate the switch control signal based on the data output enable signal.

14. The display device of claim 13, wherein the voltage generator comprises a switch controller, and the switch controller comprises: a switch input terminal for receiving the common voltage signal; a switch output terminal for transmitting the common voltage signal to the common electrode; and a switch control terminal for turning on a circuit between the switch input terminal and the switch output terminal.

15. The display device of claim 14, wherein the timing controller is configured to control the source driver to output the second data signal after the first time point, and configured to control the switch controller to turn on the circuit between the switch input terminal and the switch output terminal after the first time point;

wherein the timing controller is configured to output a switch control signal comprising a first switch control signal located after the first time point, and the switch controller is configured to control the circuit between the switch input terminal and the switch output terminal to be turned on based on the first switch control signal.

16. The display device of claim 14, wherein the switch controller comprises:

a first switch transistor, wherein a gate of the first switch transistor is configured as the switch control terminal, and a source of the first switch transistor is grounded; and a second switch transistor, wherein a gate of the second switch transistor is electrically connected to a drain of the first switch transistor, a source of the second switch transistor is configured as the switch input terminal, and a drain of the second switch transistor is configured as the switch output terminal.

* * * * *